US007895619B2

(12) United States Patent (10) Patent No.: US 7,895,619 B2
Schaefer et al. (45) Date of Patent: Feb. 22, 2011

(54) METHOD FOR CONTROLLING DISPLAY OF AUDIO-VISUAL PROGRAMMES, AND RECEIVER FOR DISPLAYING SAME

(75) Inventors: Ralf Schaefer, Acigné (FR); Mary-Luc Champel, Marpiré (FR)

(73) Assignee: Thomson Licensing, Boulogne Billancourt (FR)

( * ) Notice: Subject to any disclaimer, the term of this patent is extended or adjusted under 35 U.S.C. 154(b) by 910 days.

(21) Appl. No.: 10/476,097

(22) PCT Filed: Apr. 25, 2002

(86) PCT No.: PCT/FR02/01417

§ 371 (c)(1),
(2), (4) Date: Apr. 30, 2004

(87) PCT Pub. No.: WO02/087234

PCT Pub. Date: Oct. 31, 2002

(65) Prior Publication Data

US 2004/0181808 A1 Sep. 16, 2004

(30) Foreign Application Priority Data

Apr. 25, 2001 (FR) .................................. 01 05566

(51) Int. Cl.
*H04N 7/10* (2006.01)
*H04N 7/025* (2006.01)

(52) U.S. Cl. .............................. 725/34; 725/32; 725/35; 725/36

(58) Field of Classification Search ................... 725/32, 725/34–35
See application file for complete search history.

(56) References Cited

U.S. PATENT DOCUMENTS 5,838,314 A * 11/1998 Neel et al. ..................... 725/8

(Continued)

FOREIGN PATENT DOCUMENTS

CN 1115948 A 1/1996

(Continued)

OTHER PUBLICATIONS

Patent Abstracts of Japan, vol. 1999, No. 13, Nov. 30, 1999 & JP 11-237865.

(Continued)

*Primary Examiner*—Christopher Kelley
*Assistant Examiner*—Charles N Hicks
(74) *Attorney, Agent, or Firm*—Robert D. Shedd; Joseph J. Opalach; Reitseng Lin

(57) ABSTRACT

The invention relates to a method for controlling of the display of audio-visual program by a receiver provided with means of receiving and recording audio-visual programs. The method comprises a step of recording a first program selected by the user; and subsequent to an action by the user to display the recorded program, a step of playback a program of a second type pre-recorded in the recording means (this program being for example of an advertising type), and a step which consists in displaying the second type program before the end of the first program display for a time interval stored in the receiver, the display of the first program being conditional to the display of the second-type program. The invention is characterized in that it comprises an improvement, whereby the receiver keeps an account of the duration of display of programs of the second type and authorizes unconditionally the display of programs after a certain duration. The invention also concerns the receiver adapted to display program in accordance with the method.

20 Claims, 6 Drawing Sheets

U.S. PATENT DOCUMENTS

| | | | |
|---|---|---|---|
| 6,698,020 B1 * | 2/2004 | Zigmond et al. | 725/34 |
| 2001/0037238 A1 | 11/2001 | Gotoh et al. | |
| 2002/0104082 A1 * | 8/2002 | Fries | 725/32 |
| 2002/0124249 A1 * | 9/2002 | Shintani et al. | 725/32 |
| 2002/0138831 A1 * | 9/2002 | Wachtfogel et al. | 725/32 |
| 2002/0178446 A1 * | 11/2002 | Sie et al. | 725/32 |
| 2005/0028194 A1 * | 2/2005 | Elenbaas et al. | 725/32 |
| 2006/0136982 A1 * | 6/2006 | Martinolich et al. | 725/135 |
| 2009/0210902 A1 * | 8/2009 | Slaney et al. | 725/34 |

FOREIGN PATENT DOCUMENTS

| | | |
|---|---|---|
| EP | 0 656 728 A2 | 6/1995 |
| EP | 711076 | 5/1996 |
| GB | 2141907 | 1/1985 |
| JP | 8-115066 | 5/1996 |
| JP | 11-237865 | 8/1999 |
| JP | 2000-165335 | 6/2000 |
| JP | 2001-230996 | 8/2001 |
| WO | 98/28906 | 7/1998 |
| WO | 00/35193 | 6/2000 |
| WO | 01/58158 | 8/2001 |

OTHER PUBLICATIONS

Patent Abstracts of Japan, vol. 1996, No. 09, Sep. 30, 1996 & JP 8-115066.

Search Report dated Feb. 10, 2003.

* cited by examiner

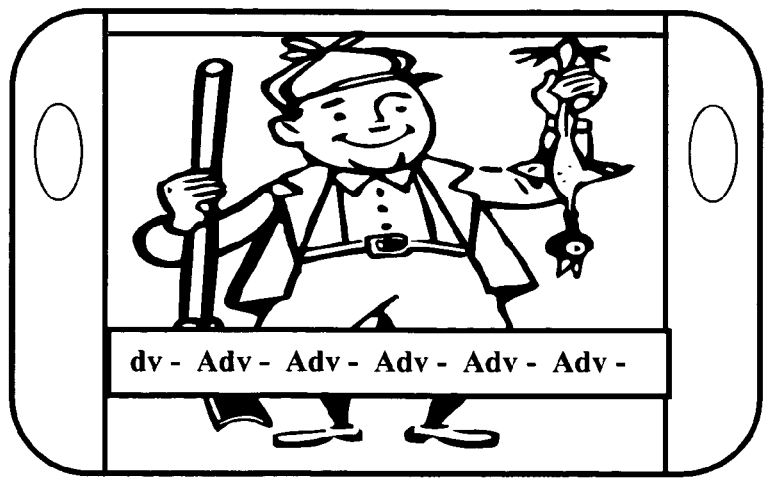
Fig 5.a
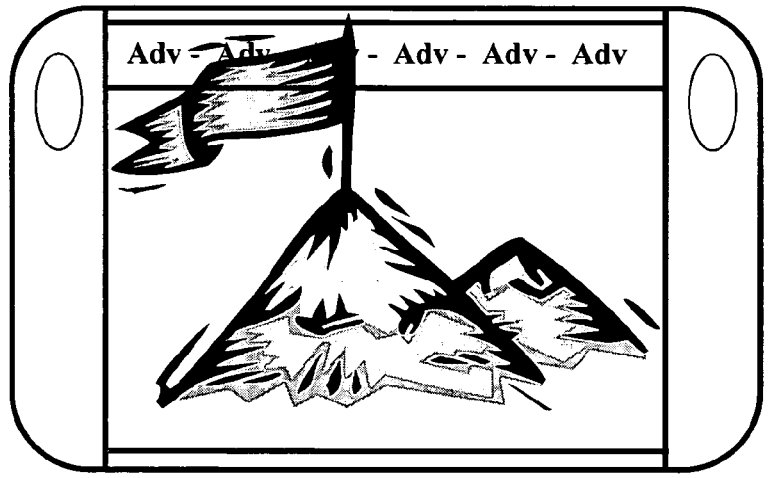
Fig 5.b
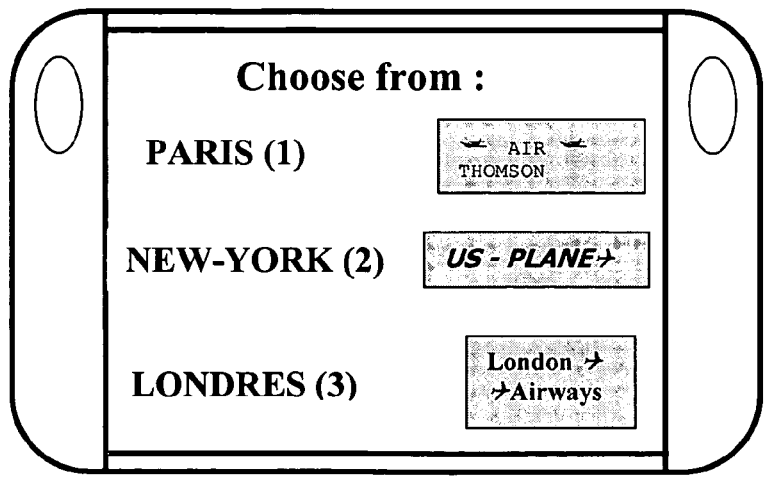
Fig 5.c

Fig 5.d
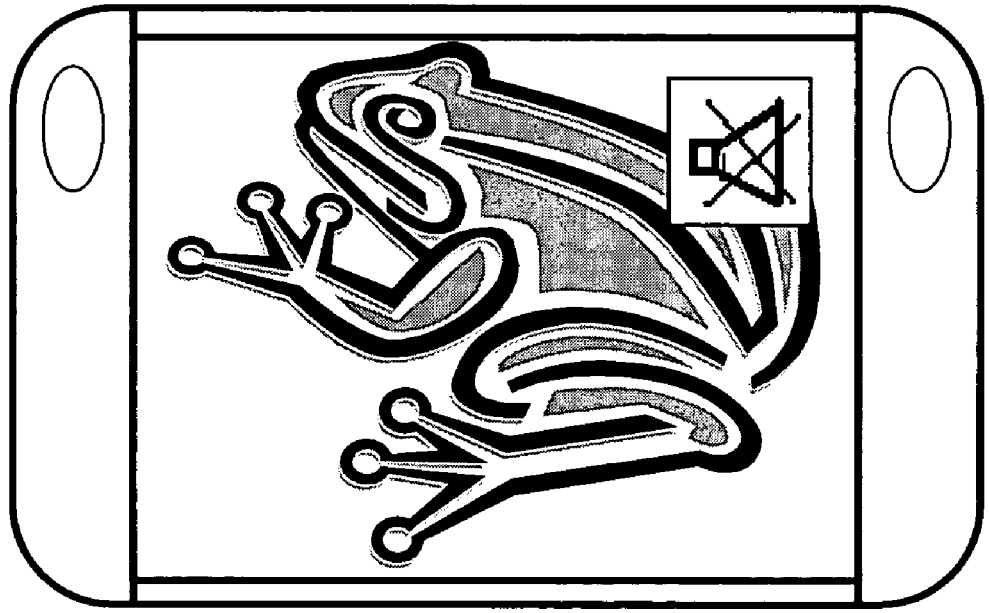
Fig 5.e

METHOD FOR CONTROLLING DISPLAY OF AUDIO-VISUAL PROGRAMMES, AND RECEIVER FOR DISPLAYING SAME

This application claims the benefit, under 35 U.S.C. §365 of International Application PCT/FR02/01417, filed Apr. 25, 2002, which was published in accordance with PCT Article 21(2) on Oct. 31, 2002 in French and which claims the benefit of French patent application No. 0105566, filed Apr. 25, 2001.

FIELD OF THE INVENTION

The invention relates to a method of control of the displaying of audiovisual programs by a receiver, and a receiver suitable for displaying them. The invention relates more particularly to receivers furnished with recording means.

BACKGROUND

Nowadays, numerous appliances make it possible to display audiovisual programs broadcast from a broadcasting network or downloaded from a high-speed digital network. These appliances include high-definition television screens, television receivers comprising in an integrated manner a means of receiving programs and a screen, the receivers making it possible to receive programs and to send them to a screen. The user can also display a program locally from a recording unit, such as for example a video recorder making it possible to record a program on magnetic tape. Recently, other means of storage have appeared making it possible to record with great flexibility of usage. These means are, for example, the DVD player/recorder (DVD-RAM), or the hard disk (HDD). These means make it possible to record programs received in real time from a broadcasting network. Access to the audiovisual sequences recorded is very fast using the indexing of the data, something which was not possible in respect of a magnetic tape that had to be wound on before reaching a specific sequence. The integration of a recording means into a receiver increases its cost.

Patent application EP 711 076 describes an interactive communication system encouraging a user to watch adverts and capable of gathering the reaction of the user in response to these advertising sequences. Patent application GB 2 141 907 describes a video game controlled by a means of payment such as a coin-operated machine. Advertising sequences are recorded and automatically incorporated into the video sequences of the game. Japanese patent application JP10041777 describes a means for detecting the presence of a user in front of his television screen and a means for changing the content displayed as a function of the user watching the screen. The content displayed may be advertising sequences. Japanese patent application JP06250738 describes a means for displaying an advertising sequence on a display screen intended for a "karaoke" application, a presence detector causes the content of the screen to change and allows it to be used for the time of a piece of music.

In the consumer world in which we are currently living, advertising holds an important place, the budget related to this activity is considerable in the audiovisual sector. Advertisers pay fees to broadcasters in respect of the broadcasting of advertising messages that will be viewed by the users. These advertising messages are sent between two audiovisual programs, or in the middle of a program. Television channels and program broadcasters are in large part financed by the broadcasting fees paid by advertisers. If the messages are broadcast with the aid of a unidirectional broadcasting network, the broadcasters do not know the number of users present in front of their sets during the broadcasting of the programs. They use surveys to ascertain audience figures, but this information is always approximate.

The object of the present invention is to offer another alternative to a user wishing to acquire and to use a receiver of audiovisual programs furnished with a recording means. This alternative makes it possible to acquire and to use such an appliance while reducing the acquisition fee thereof for the user.

The invention also affords advertisers a new means of broadcasting their advertising messages. Moreover, when the users use the receiver normally and view the advertising messages, the advertisers potentially know in advance the quantity of messages viewed and the number of users reached by the messages.

SUMMARY OF THE INVENTION

The invention proposes a method of control of the displaying of audiovisual programs by a receiver furnished with a means of recording audiovisual programs, wherein it comprises the following steps:
 recording of at least one first program selected by the user; and following an action by the user to display the first recorded program:
 reading of one at least second program prerecorded in the recording means;
 displaying of said second program before the end of the displaying of the first program for a duration stored in the receiver, the displaying of the second program being a condition for displaying the first program.

In this way, the obligation for the user to concomitantly display first and second programs is the counterpart of the displaying of the programs recorded. The second programs are typically advertising messages posted by advertisers. Thus, by using the above method, a user can acquire, from a distributor, an appliance capable of storing and of displaying advertising messages, acquisition being effected with a reduction in cost by virtue of the prospective fees corresponding to the messages that will be displayed by this appliance.

According to a first particular embodiment, the displaying of the first programs is performed in the course of successive periods. The duration of display of the second program is either dependent on the aggregated duration of display of the second programs already displayed in the course of the previous period, or dependent on the aggregated duration of display of the second programs already displayed in the course of the current period.

According to another particular embodiment, the method comprises a step of counting the displayings of one at least second program, and a step of erasing the second program in memory of the receiver when the counter reaches a certain value. It is thus possible to free up the memory whose content has become unnecessary and guarantee the advertiser a specific number of displaying for each message.

According to another particular embodiment, the method comprises a step of so-called "unrestricted" display in the course of which the user can view first programs whilst not being obliged to view second programs. This step of unrestricted display intervenes after a specified duration of usage of the receiver, this duration being fixed when the receiver is brought into service by the user.

According to another particular embodiment, the step of unrestricted display intervenes after an aggregated specified duration of display of second programs, this duration being fixed when the receiver is brought into service by the user. An improvement consists in the duration of display of a second program taken into account in the calculation of the aggregate increasing when the second transmission is interactive. Another improvement consists in the method comprising a step of detecting the presence of at least one user in front of his screen. If the detector does not detect the presence of a user in proximity to the receiver, the duration of display of second programs is not taken into account in the calculation of the aggregate.

According to another particular embodiment, the method comprises a step of entering a user profile. The profile information makes it possible to filter in the course of the step of reading the second programs a part at least of the second programs.

The invention also proposes a receiver of audiovisual programs comprising a means of receiving first audiovisual programs, a means of display and a means of storage for displaying and recording first audiovisual programs, said first programs being recorded subsequent to a command from the user, wherein it comprises a means of control associated with the means of storage, second programs being recorded by the means of control without intervention from the user, the means of control authorizing the reading and the displaying of the first transmissions programs if second programs are read and displayed before the end of the display of the first programs for a duration stored in the receiver.

BRIEF DESCRIPTION OF THE DRAWINGS

The present invention will now appear with greater detail within the framework of the description which follows of exemplary embodiments given by way of illustration while referring to the appended figures which represent.

DETAILED DESCRIPTION

Figure 1:
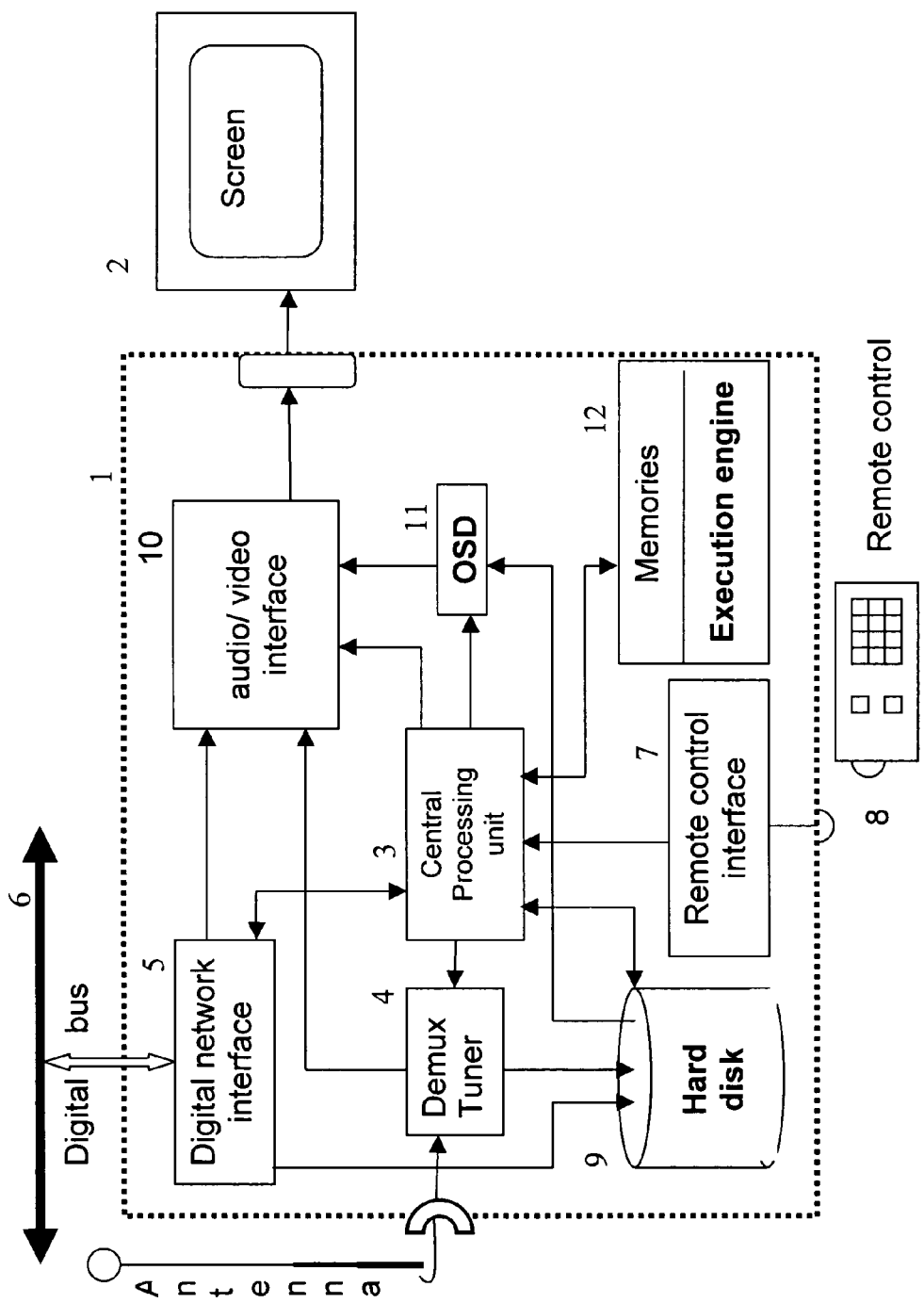
FIG. 1 is a block diagram of an audiovisual receiver for the implementation of the invention.

The manner of operation of an audiovisual receiver 1 furnished with a display device 2 will firstly be described with the aid of FIG. 1. The receiver comprises a central unit 3 linked to a (ROM) program and (RAM) work memory 12, and an interface 5 for communication with a high-speed local digital bus 6 making it possible to transmit audio/video data in real time. This network is for example an IEEE 1394 network. The receiver can also receive audio/video data from a broadcasting network through a receiving antenna associated with a demodulator 4. The receiver furthermore comprises a receiver of infrared signals 7 for receiving the signals from a remote control 8, a means of storage 9 for audiovisual program storage, and audio/video decoding logic 10 for generating audiovisual signals sent to the television screen 2. The nature of the audiovisual programs being digital, the storage means 9 is preferably a hard disk (HDD), it may also be a recordable optical disk player/recorder (DVD-RAM).

The remote control 8 is furnished with direction keys ↑, ↓, → and ← and with keys: "OK" and "Select", the function of which we shall see later. The receiver also has a clock (not represented) making it possible to meter durations individually or in the course of a period such as an hour or a month.

The receiver also comprises a circuit 11 for displaying data on the screen, often called an OSD circuit, standing for "On Screen Display". The OSD circuit 11 is a text and graphics generator that makes it possible to screen menus, pictograms (for example, a number corresponding to the channel displayed), or that makes it possible to mix two audiovisual contents. The OSD circuit is controlled by the Central Unit 3 and an execution engine contained in the memory 12. The Execution Engine, EE for short in the rest of the document, typically consists of a program module resident in read-only memory and of parameters recorded in work memory. The EE can also be embodied in the form of a customized circuit of ASIC type for example. This circuit can be furnished with security functions, the function of which we shall see in the rest of the document.

The receiver receives data representing audiovisual programs from the digital bus 6 and/or from the broadcasting network. With the aid of an EPG (Electronic Program Guide) and of the keys of his remote control, the user selects programs and instructs recording in the hard disk 9.

Figure 2:
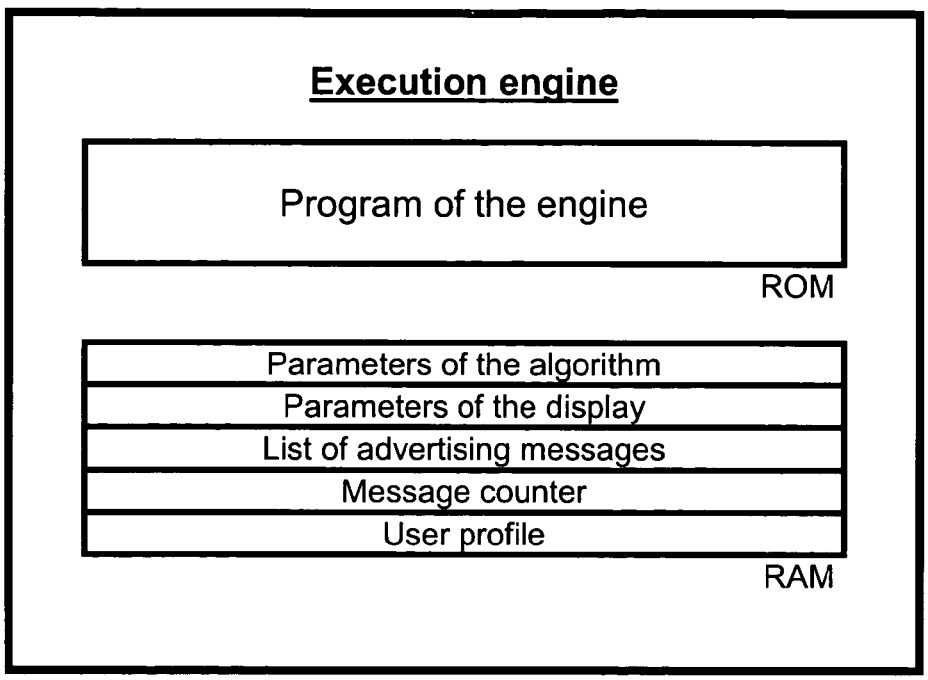
FIG. 2 presents the various parts of the execution engine.

The execution engine EE, as shown by FIG. 2, comprises two parts, the first is the executable program (written in ROM memory of the receiver), and the second is an area of parameters in backed-up RAM work memory of the receiver. The executable program carries out the following functions, some of which are optional:

Control and management of exchanges with the hard disk.
Control of the program of advertising messages with the aid of a selection algorithm.
Management of the display of advertising messages.
Modification of the profile of the user (option).
Selection of advertising messages according to the profile of the user (option).
Updating of the recorded advertising messages (option).

The parameters used by the execution engine relate to:

The programming of the advertising messages selection algorithm.
The user interface display parameters.
The state of the advertising messages program campaign.
The profile of one or more users of the receiver.
The list of advertising messages to be displayed and the pointers allowing them to be extracted from the hard disk.

Figure 3:
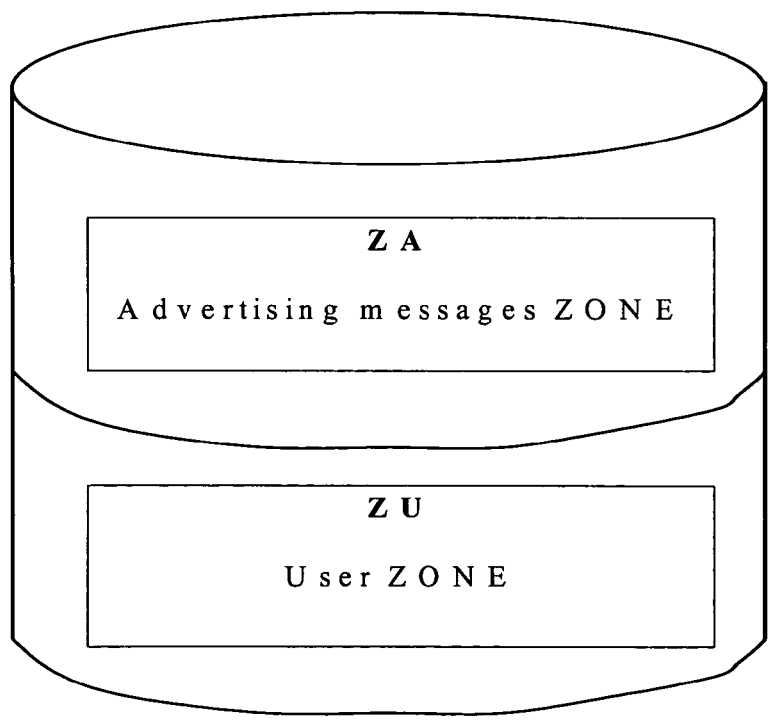
FIG. 3 shows the content of the hard disk.

The memory, represented in FIG. 3, of the hard disk is split into two areas: the first area (ZU) is usable by the user for the storage of the programs that he selects, and the second (ZA) is used for storage of the advertising messages provided by the advertisers. When the user acquires the receiver, the first part is blank, the second may already contain advertising messages or may be blank, in this latter case the advertising messages will be recorded as soon as the device is installed at the user's premises.

Figure 4:
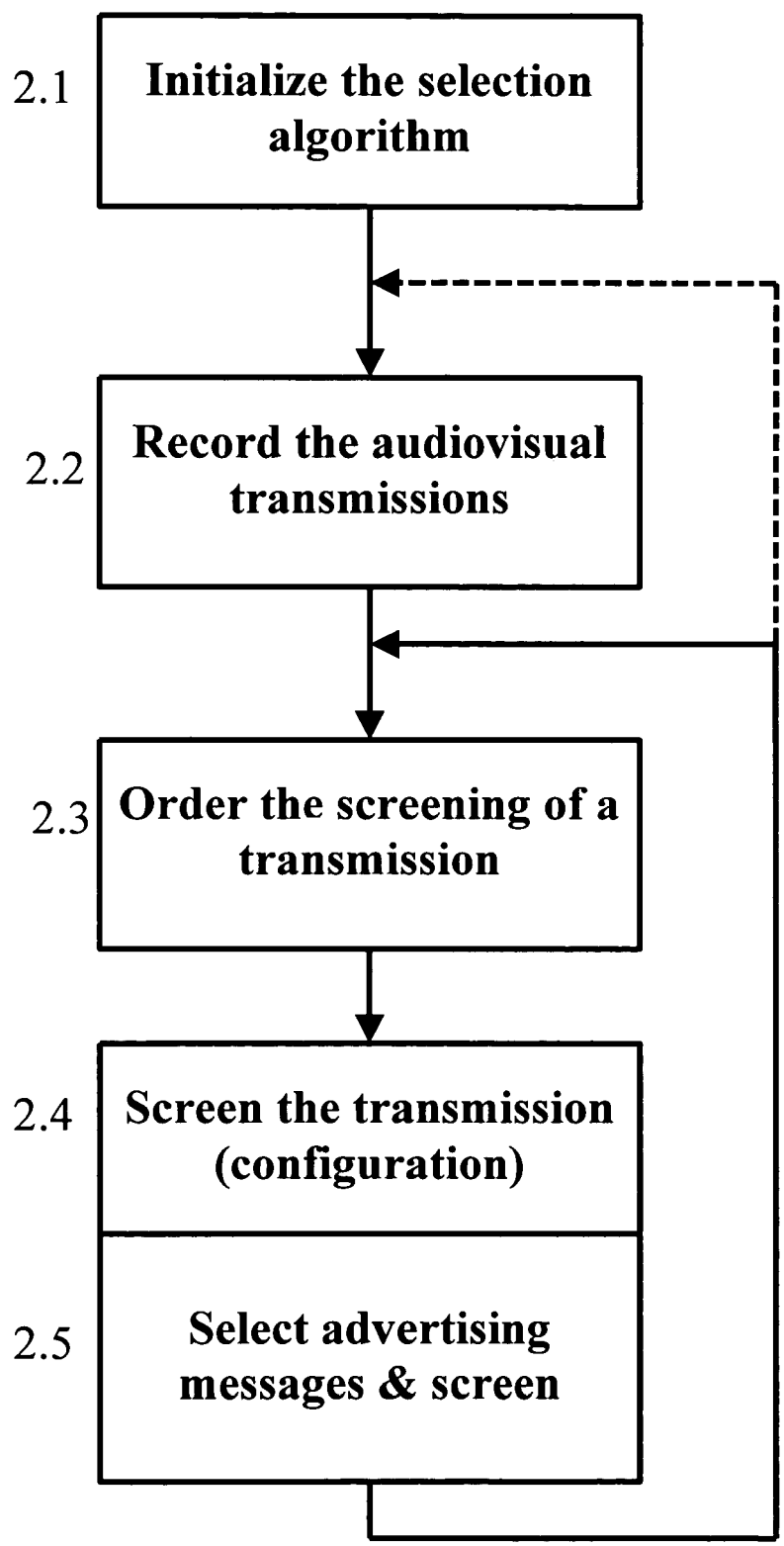
FIG. 4 shows a general flowchart of the running of the execution engine, FIGS. 5.*a*, 5.*b*, 5.*c*, 5.*d* and 5.*e* represent screen shots for the implementation of the invention.

Having detailed the various elements of the invention, we shall now explain how they cooperate. FIG. 4 shows a general flow chart of the running of the execution engine.

The distributor of receivers is associated with one or more promoters of advertising messages who send him advertising messages. Moreover, he calculates a cost for the appliance and calculates the number and the duration of advertising messages for which the sum of the broadcasting fees is equal to this cost. In the course of a first step 4.1, he writes to the parameters area of the algorithm in RAM memory of the receiver, the parameters relating to the calculated number and to the calculated duration. The distributor also configures the mode of display of the messages. He can also record the first advertising messages in the area ZA of the hard disk, but this is not compulsory since the messages can be recorded subsequently at the user's premises. The receiver duly configured, the distributor invites the users to acquire them.

To conclude the acquisition of the receiver, the user undertakes to use it in a certain manner. The distributor offers him two options:

Option A—The quantity of advertising messages is fixed, for example two hours per month maximum.

Option B—The quantity of advertising messages is dependent on the usage of the receiver, for example five minutes each hour of usage.

Option A allows anyone who uses his appliance a lot to pay the acquisition fees quickly and after a certain time, to no longer view the advertising messages sent by the EE. Let us assume for example that these fees are equal to those consisting in viewing 12 hours of advertising messages, a user watching such messages for three hours a month will be able, after four months, to view the programs recorded in his receiver without being obliged to watch advertising messages sent by the EE. In this way, during normal operation, that is to say with the user in front of his screen, the promoter knows during acquisition of the receiver the potential quantity of messages that will be viewed by the user.

Option B relates to people who use their receivers less often. A longer duration will then be necessary in order to display the scheduled duration of advertising messages. This duration in the course of which the EE is able to send messages depends only on the usage of the receiver.

When the user switches on the receiver, the EE is automatically booted and will firstly load the parameters of the backed-up RAM memory. Next, the EE is invoked during each access to the hard disk. For example, the user boots up an EPG, selects a programs and programs a recording in the hard disk. At the start of the recording step 4.2, the execution engine computes the address of a location available in the area ZU to which the audiovisual data of the program are thereafter written. Then in step 4.3, the user wishes to display this program and instigates a command for displaying the audiovisual content of the hard disk. In step 4.4, the execution engine reads the program and sends the audiovisual signals to the screen. In step 4.5, the EE decides to read an advertising message and to send it to the screen. The sending of the advertising messages to the screen is determined by the selection algorithm written in the execution engine and by the parameters imprinted upon the acquisition of the receiver. For example, the parameters may be the displaying of three minutes of advertising messages with each hour of displaying of a recorded program.

The sending of the audiovisual data to the screen is controlled by the EE and not by the user. To avoid fraud consisting in misappropriating certain electrical signals so as to avoid showing the advertising messages, the OSD and/or the EE is furnished with security functions. The showing of the advertising message is effected in one of the ways which will be described subsequently, the choice being left preferably to the user, and is possible either when he acquires his appliance, or during usage thereof by virtue of a function accessible via a menu. The execution of the selection algorithm depends on the choice of option and the parameters recorded in the RAM memory of the EE.

The advertising messages generally have a short life time, this is why the receiver subsequently does updates and records new advertising messages. The oldest messages are replaced with messages originating from the broadcasting network or from the digital bus 6. The distributor can thus, through one or the other network, transmit new advertising messages destined for the receivers. The updating of the advertising messages is controlled by the EE. The advertising messages being recorded on the receiver, the sending of these messages can be done at any time of day and a fortiori at the cheapest times for the broadcaster (at night for example).

The advertising messages are read from the hard disk 9 and sent to the screen before the end of the displaying of the audiovisual program selected by the user. If the two audiovisual contents are shown on the screen at the same time, the mixing of the signals is performed at the level of the OSD circuit with the aid of inlaying technique. For example, if the advertising message is shown on a banner, it typically occupies 30 lines of the screen (which has 625 of them). The EE reads the memory for storing the advertising messages, transforms the messages into pictures and sends them to the OSD circuit, specifying the position of the banner on the screen. The displaying of the advertising messages in the course of the audiovisual programs can be performed in various ways, illustrated by FIGS. 5.$a$, 5.$b$, 5.$c$, 5.$d$, 5.$e$:

■ Display by Advertising Banner

The simplest way of showing the message, described by FIG. 5.$a$, is the advertising banner which occupies an area of the screen. The message may scroll through this banner in various ways. The message appears stationary in the banner for a certain time, it is then replaced with another one. This first way of doing things is usable when the whole of the advertising message can be shown in the banner. A second way consists in scrolling the same message several times before replacing it with another one. Another way is to post up the messages at regular intervals, so that, between two messages, the whole of the useful area of the screen is occupied in respect of the video signal. Another way consists in having the display area of the advertising banner displayed randomly. The background of the banner may be opaque thus masking part of the audiovisual program, it may also be transparent.

In the first embodiment, the receiver distributor chooses the position of the advertising banner: at the top of the screen or at the bottom, the messages scrolling horizontally; or, on the side, the messages then are scrolling vertically. An improvement consists in the position of the banner being modifiable by the user. The latter then uses the direction arrow keys of the remote control, pressing the ↑key positions the banner at the top, the ↓key positions the banner at the bottom, the ←and →keys position the banner on the left or on the right. All the display parameters are imprinted into the "display parameters" area in the RAM part of the EE.

■ Display in the Course of the Film

In the previous case illustrated by FIG. 5.$b$, the user displays the advertising messages at the same time as the program that he has selected. In this case, the program is interrupted for the time of display of the advertising messages and will resume thereafter. If the EE so authorizes (this option can be activated by the distributor and/or the advertiser), the user can choose the moment of display of the advertising messages, for example at the start, in the course or at the end of the program. When the user wants to watch a film that he has previously recorded, the EE displays a menu allowing him to choose the manner in which he wants to display the advertising messages. Once all the advertising messages have been displayed, the EE no longer transmits any advertising messages up to the end of the displaying of the selected program. However, the user could be tempted to absent himself during the displaying of the advertising messages, and not return until the displaying of his program, this not being within the spirit of the contract that binds him to the distributor associated with the advertiser. To forestall this behavior, an improvement of the invention consists in furnishing the receiver with a presence detector which makes it possible to be certain of the presence of the user in front of his screen. We shall explain subsequently how such a detector operates.

In the two ways of display that have just been presented, the user has a passive role, it is the EE that imposes the displaying of the messages on him. The other ways which will be described possess more flexibility, since the user can authorize or otherwise the displaying of the messages.

■ Display with Interactivity Sequences

Certain audiovisual programs are interactive applications. During their display, the user can modify the running of the program with the aid of commands provided by the broadcaster and formulated on the remote control of the receiver. Such is the case for example during televised games or to modify the film scenario. In the same manner as for the interactive applications, the execution engine offers the user a choice, he thus being able to modify the manner of displaying the advertising messages. As depicted in the example illustrated by FIG. 5.c, the user can choose the subject of the advertising message of most interest to him, in this instance a travel destination, the logo of the airline being posted alongside.

The displaying of interactive advertising applications is constraining for the user who must act in response to the questions. Therefore, in exchange the EE grants greater rights for the user than those corresponding to the displaying of conventional advertising messages for the same duration of display.

■ Icon-Controlled Display

This case, illustrated by FIG. 5.d, consists in having an icon displayed on the screen, thus indicating to the user that it is possible for him to display an advertising message at that moment. With the aid of the "OK" key of his remote control, the user enables the icon, thereby interrupting the display of the selected program and instigating that of the advertising message. The icon flashes on the screen either right from the start, or after a certain time, this flashing is an indication or a reminder to the user to authorize the displaying of the advertising messages. If the user does not enable this icon after a certain time, the EE interrupts the displaying of the program and the picture on the screen is frozen for as long as the user does not enable the icon. Another possible action of the EE and to instigate, without enable on the part of the user, the displaying of the advertising messages. After display, the icon disappears. Relative to the last action described, the EE does not meter the advert as having been viewed and can after a certain time proffer it again.

■ Forced Display by Sound Muting

In this case, illustrated by FIG. 5.e, and with the aim of encouraging the user to authorize the displaying of the messages (or quite simply to remind him), the sound is muted and an icon representing the symbol of a barred loudspeaker appears on the screen. When the user presses the "OK" key, he enables the choice of watching the next advertising message. As long as the user has not enabled, the sound remains muted.

We alluded previously to the fact that it is not certain that the user is in front of his screen and thus that he is viewing the advertising messages. This aspect is important since this displaying conditions the acquisition of the receiver. An improvement consists in a user presence detector being integrated into the ME. This improvement is described with reference to FIG. 6.

Figure 6:
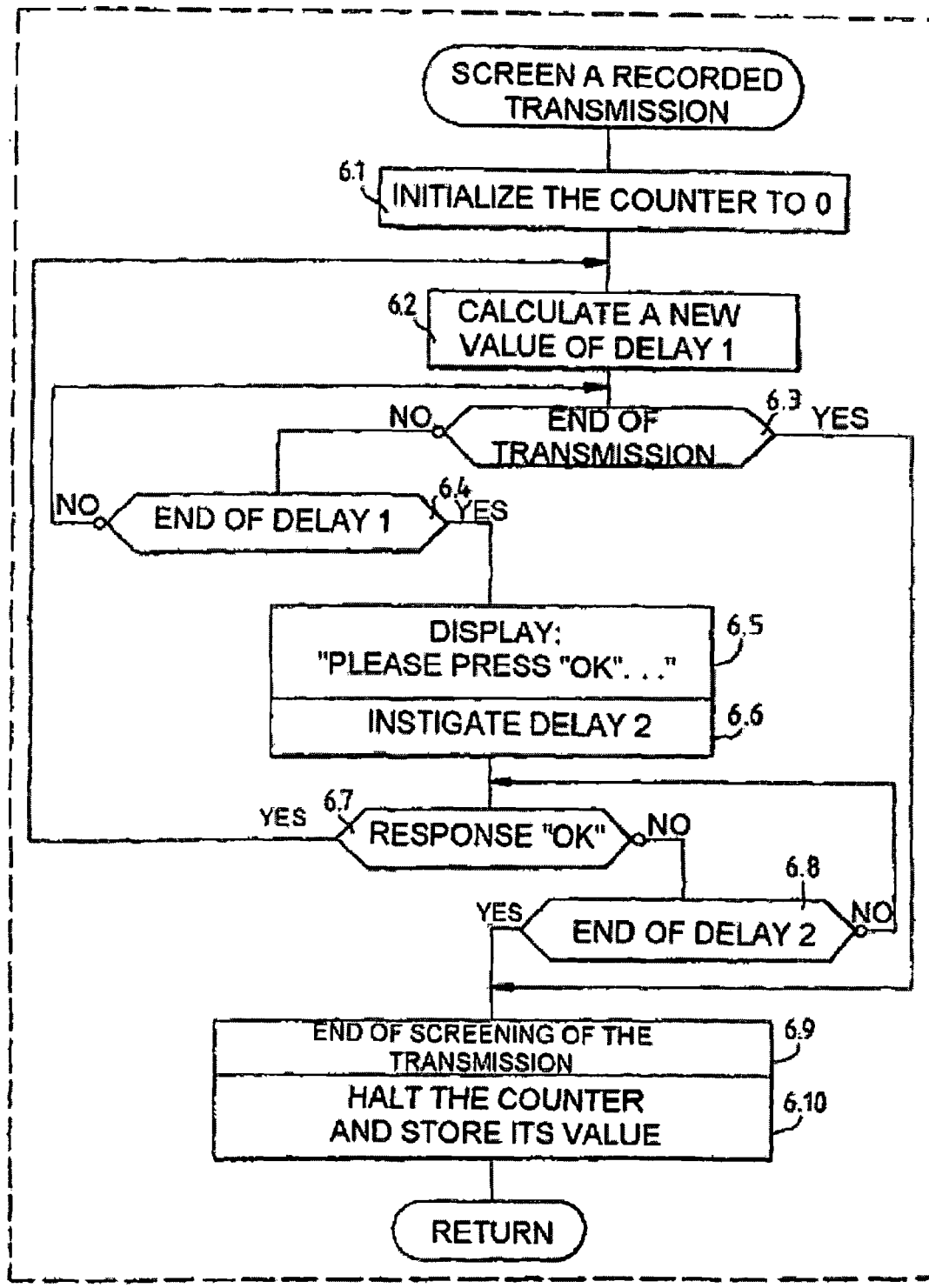
FIG. 6 represents a flow chart of the execution of an improvement element of the invention.

The flow chart of FIG. 6 presents an algorithm integrated into the EE for the detection of presence of the user in the course of the displaying of a program. In step 6.1, the program initializes a counter to zero. This counter makes it possible to meter the time spent in watching the program and the advertising message. In step 6.2, the program computes the value of a first timeout TEMPO 1. The value of this timeout is in a preferred manner controlled by the distributor. In a particularly simple manner, it is fixed, five minutes for example. A variant consists in making it random, varying between two limits, five minutes to ten minutes for example. Another variant consists in the appearance of the message being triggered by the ME. Next, the program tests whether the end of the program has been reached (step 6.3). If this is not the case, the end of the timeout 1 is tested (step 6.4) and the program loops back if the two tests are negative. When the end of the timeout 1 has been reached, the program in step 6.5 displays the following message right in the middle of the screen:

---
If you wish to continue displaying the transmission,
please press the "OK" key.
Hit any other key to interrupt display.

---

Next, a second timeout is instigated (step 6.6), defining a duration in the course of which the user can respond. If the user presses the "OK" key thereby signaling his presence (step 6.7), the program jumps to step 6.2 and the user can continue to view his program. As long as the user has not responded correctly and the second timeout has not terminated, the program loops back (step 6.8). When the end of the second timeout is reached without the user having signaled his presence, the program halts the display of the program (step 6.9). Next, it stops the time counter and adds its value to that already written to the memory 12 (step 6.10). The value written represents the duration for which the user is considered to be present in front of his television. The advertising messages displayed during that time are considered to be viewed by the user. An improvement consists in the receiver transmitting, during the second timeout, an audible signal as an accompaniment to the message displayed on the screen, for example a particular sound or a tune. In this manner, if the user is distracted and is not at that moment watching his screen, he can nevertheless be warned that he should react if he wishes the appliance to recognize his presence.

The flowchart of FIG. 6 shows an exemplary embodiment of a presence detector. Other devices making it possible to detect the presence of an individual in front of a receiver exist. It is, for example, possible to use infrared or RF detectors, or else a camera furnished with a shape recognition device. The latter device having the advantage of recognizing the individual or individuals, and of subsequently computing statistical calculations regarding the behavior of users in front of the broadcasting of such or such advertising messages.

Another variant of interactive advertising applications consists in asking questions relating to the latest advertising messages displayed. Let us assume for example that an advertising message for a new fruit juice called "Borno" has been displayed, a few minutes later the EE displays the following message:

---
Remember the last advert:

| | | |
|---|---|---|
| Is "BORNO" | the name of a car | [1] |
| | a brand of fruit juice | [2] |
| | a make of shampoo | [3] |
| please answer by pressing the key indicated. | | |

If the user answers quickly and correctly, the execution engine considers that the user has proven that he was present during the display of the latest advertising messages. In the converse case, the user did not actually watch the advert, he acquires no right. Just as when displaying advertising messages with interactivity sequences, the user can be rewarded for his answers by the acquisition of additional rights.

According to another mode of operation, if the user has already displayed the total duration of the messages corresponding to the acquisition rights for the appliance, the EE no longer displays any advertising messages during the displaying of recorded programs. The area ZA disappears from the hard disk which is then devoted totally to the recording of the programs selected by the user. This does not imply that the receiver will no longer send advertising messages since the latter may still be received in the course of a normal reception of a program, but these messages will not be transmitted by the ME. According to an improvement, the distributor can also provide for a limited duration of the undertaking, for example a year. After this duration, the receiver is free to be used without obligation to display advertising.

According to another improvement, the right conferred by the broadcasting of an advertising message depends on its type. Messages which afford advertisers an additional service or advantage to that of simply advertising a product, are billed with a supplement, and hence the rights conferred by displaying them are greater than those corresponding to straightforward messages of an equal duration. For example, the displaying of an interactive advertising application, where the user gives an opinion regarding the product featured in the message, affords the advertiser very useful information that the broadcaster subsequently bills to the advertiser. Therefore, the broadcasting of such messages represents a greater broadcasting fee than that of a no interactive advertising message of an equal duration. For example, a one-minute interactive message is equivalent in terms of broadcasting fees to a two-minute no interactive message. With this improvement the user's action can be made worthwhile without however forcing him to be present (if he is not active he loses the additional rights conferred by such messages, in the above example, if he is not present the EE meters just one minute of display instead of two).

According to another improvement, the duration of display of the advertising messages per unit time decreases in tandem with the usage of the receiver in the course of a period. Let us consider for example a period of one day, during the first hour of display, the selection algorithm instructs the program of 15 minutes of advertising messages. In the course of the second hour, the algorithm instructs five minutes of program, and then beyond the fourth hour, no program of advertising messages is instructed. The next day, the algorithm retrieves the starting parameters: 15 minutes in the course of the first hour, five minutes in the course of the second and third hours, and no message onwards of the fourth hour. These parameters are written to the RAM memory allocated to the ME. According to another improvement, the quantity of advertising messages varies as a function of the quantity of messages already displayed. For example, if the user has watched adverts for one hour during a month and if on acquisition he undertook to display two hours of advertising messages a month, the EE will send three hours of adverts in the course of the next month.

According to another improvement, the advertising messages are associated with display counters initialized to a specified value. This value decreases by one unit with each display of the message associated with the counter. When the value becomes zero, the message is erased from the memory thus freeing up some space. This erasure can be benefited from in order to increase the size of the area ZU, or to record new advertising messages. This improvement makes it possible to manage a specific number of displays for each message.

According to another improvement, some at least (for example 50%) of the advertising messages are filtered so that they correspond to the profile of the user. The profile of the user, written to an area of the backed-up RAM memory, contains a list of topics preferred by the user. The audiovisual content of the advertising messages is associated with a topic cue characterizing the message. The taking of the profile into account consists in selecting only the advertising messages for which at least one topic corresponds to one of those of the user. The filtering of the messages occurs either at the moment of recording the messages in the area ZA, or at the moment of reading the messages from the area ZA. An improvement of this latter improvement consists in the receiver possessing a means of determining the identity of the user. For example, this means consists in entering an identification number with the aid of the remote control during power-up. This means of determination can also be an optical device recognizing with the aid of a camera the user who is in front of the receiver. This means may be the same as that alluded to previously for detecting the presence of the user in front of the receiver in the course of the displaying of the advertising messages.

The exemplary embodiments of the invention presented hereinabove have been chosen for their concrete nature. However, it would not be possible to exhaustively catalogue all the embodiments covered by this invention. In particular, any step or any means described may be replaced with an equivalent step or means without departing from the scope of the present invention.

The invention claimed is:

1. Method of control of the displaying of audiovisual programs recorded in a receiver furnished with a means of recording audiovisual programs, the method comprising:
   recording of at least one first program selected by the user;
   recording of several second programs to be displayed, these second programs being recorded before the recording of any first program selected by the user;
   and following an action by the user to display the first recorded program:
      reading of one at least second program received independently of the first program and pre-recorded in the recording means;
      displaying of said second program before the end of the displaying of the first program, the duration of the displaying of the second program depending on a number of previous displays of said second program, the displaying of the second program being triggered by the receiver at a time determined by the receiver for displaying the first program, and not depending on the parameters associated with the first program selected by the user; and
      entering at least a profile of the user, said profile filtering in the course of the reading the second program at least a part of the second program.

2. The method of control of claim 1, wherein the displaying of the first programs is performed in the course of successive periods, and in that the specified duration of display of the second program depends on the aggregated duration of display of the second programs already displayed in the course of the previous period.

3. The method of control of claim 1, wherein the displaying of the first programs is performed in the course of successive periods, and in that the specified duration of display of the second program depends on the aggregated duration of display of the second programs already displayed in the course of the current period.

4. The method of control of claim 1, further comprising counting the displayings of one at least second program, and erasing said second program in memory of the receiver when the counter reaches a certain value.

5. The method of control of claim 1, further comprising unrestricted display of the first recorded programs, said unrestricted display intervenes after a specified time of usage, said time being specified when the receiver is brought into service by the user.

6. The method of control of claim 5, wherein the specified time of usage is calculated from the aggregate of the durations of display of second programs.

7. The method of control of claim 6, wherein the duration of display of a second program taken into account in the calculation of the aggregate increases when the second program is interactive.

8. The method of control of claim 6, further comprising detecting the presence of a user, the duration of display of second programs in the course of which an absence of user is detected is not taken into account in the calculation of the aggregate.

9. The method of control of claim 1, further comprising entering a profile of the user, said profile filtering in the course of the reading the second programs a part at least of the second programs.

10. A receiver of audiovisual programs comprising
a means of receiving first audiovisual programs,
a means of display and a means of storage for displaying and recording first audiovisual programs and several second programs to be displayed, said first programs being recorded subsequent to a command of selection from the user, said second programs being recorded before the recording of any first program selected by the user;
wherein said receiver comprises
means of control associated with the means of storage, second programs being received independently of the first transmission and being recorded by the means of control without intervention from the user, the means of control authorizing the reading and the displaying of the first programs if second programs are read and displayed before the end of the display of the first programs, the duration of the displaying of the second program depending on a number of previous displays of said second program, and at a time determined by the receiver, and not depending on the parameters associated with the first program selected by the user; and
means of entering at least a profile of the user, the means of control selecting at least a part of the second programs stored as a function of said profile in the course of the reading the second programs.

11. The receiver of claim 10, further comprises a counter of time of actual display of second programs in the course of successive periods, the specified duration of display of second programs depends on the duration of actual display in the course of the previous period.

12. The receiver of claim 10, further comprises a counter of time of actual display of second programs in the course of successive periods, the specified duration of display of second programs depends on the duration of display of second programs, already performed in the course of the current period.

13. The receiver of claim 10, further comprises a plurality of display counters associated with the second programs, and a means of erasing the second program when the associated counter reaches a predetermined value.

14. The receiver of claim 10, further comprises a clock making it possible to calculate the duration of usage of the receiver since the receiver was brought into service, the means of control authorizing the reading and the displaying of the first programs without instructing displaying of second programs when the duration of usage indicates that a specified time has elapsed.

15. The receiver of claim 14, wherein the clock meters the duration of display of the second programs since the receiver was brought into service.

16. The receiver of claim 10, further comprises a detector of the presence of the user in proximity to his receiver, the metering of the duration of actual display of second programs being halted when said detector does not detect the presence of the user.

17. The method of control of claim 1, wherein the second prerecorded programs are adverts and in that the purchase price of said receiver drops as a function of the stored duration of display of the second programs.

18. The receiver of claim 10, further comprises a means of mixing the visual signals of the first and second programs read from the means of storage, in such a way that the visual content of the programs appears at the same time on a means of display.

19. The method of control of claim 1, further comprising determining the identity of the user viewing the receiver, using the profile of said user for filtering at least a part of the second program.

20. The receiver of claim 10, further comprises a means of mixing the visual signals of the first and second programs read from the means of storage, in such a way that the visual content of the programs appears at the same time on a means of display.

* * * * *